United States Patent [19]

de Pous

[11] 4,278,466
[45] Jul. 14, 1981

[54] TITANIUM ALLOY COMPOSITION AND METHOD FOR THE STORAGE OF HYDROGEN

[75] Inventor: Olivier de Pous, Geneva, Switzerland

[73] Assignee: Battelle Memorial Institute, Geneva, Switzerland

[21] Appl. No.: 92,656

[22] Filed: Nov. 9, 1979

[30] Foreign Application Priority Data

Nov. 14, 1978 [CH] Switzerland .................. 11674/78

[51] Int. Cl.³ .................. C22C 30/00; C01B 6/02; F17C 11/00
[52] U.S. Cl. .................. 75/175.5; 75/134 F; 75/134 M; 75/134 N; 423/644
[58] Field of Search ............. 75/175.5, 123 M, 134 M, 75/134 F, 134 N; 423/644

[56] References Cited

U.S. PATENT DOCUMENTS

| | | | |
|---|---|---|---|
| 3,660,082 | 5/1972 | Negishi et al. | 75/134 |
| 3,922,872 | 12/1975 | Reilly et al. | 62/48 |
| 4,069,303 | 1/1978 | Yamadaya et al. | 423/644 |
| 4,079,523 | 3/1978 | Sandrock | 34/15 |
| 4,111,689 | 9/1978 | Liu | 75/122 |
| 4,160,014 | 7/1979 | Gamo et al. | 423/644 |

FOREIGN PATENT DOCUMENTS 2650276  5/1977  Fed. Rep. of Germany .......... 423/644

OTHER PUBLICATIONS

Reilly et al., "Hydrogen Storage and Purification System II", BNL-19436, Aug. 1974.

Primary Examiner—L. Dewayne Rutledge
Assistant Examiner—Upendra Roy
Attorney, Agent, or Firm—Karl F. Ross

[57] ABSTRACT

A titanium-iron-type alloy for the storage of hydrogen having an atomic composition corresponding to the formula $Ti_wFe_xM'_yM''_z$ in which $M'$ is a substituent for iron from the transition metals of group Vb or group VIb of the periodic system, $M''$ is another iron substituent selected from the group which consists of nickel and manganese but which is nickel when $M'$ is chromium and y and z are each between 0.01 and 0.2; w, representing the atomic concentration of titanium is at least equal to the sum $x+y+z$. The alloy can be charged with hydrogen, stored and desorbed from hydrogen.

10 Claims, 6 Drawing Figures

- ● 49 : Ti - Fe - Cr - Ni
- □ 41 : Ti - Fe - Cr
- × 26 : Ti - Fe - Ni
- ○ 25 : Ti - Fe

- ■ 48 : Ti - Fe - V - Ni
- ▽ 39 : Ti - Fe - V
- × 26 : Ti - Fe - Ni
- ○ 25 : Ti - Fe

- ▲ 107 : Ti-Fe-V-Mn
- ▽ 39 : Ti-Fe-V
- + 27 : Ti-Fe-Mn
- ○ 25 : Ti-Fe

TITANIUM ALLOY COMPOSITION AND METHOD FOR THE STORAGE OF HYDROGEN

FIELD OF THE INVENTION

The present invention relates to a composition and a method for the storage of hydrogen and, more particularly, to a titanium-iron-type alloy adapted to be charged with hydrogen, stored and desorbed from hydrogen.

BACKGROUND OF THE INVENTION

With increasing interest in alternative energy sources and for many years applications, it is desirable to store hydrogen in a metal by subjecting the metal or alloy thereof, to a temperature and pressure and which contact with hydrogen will cause hydrogen to be absorbed by the metallic composition. The latter can then be stored and subjected to another set of temperature and pressure conditions at which hydrogen will be released in a gaseous state, i.e. made available for whatever purpose the hydrogen can serve, e.g. as a fuel or for some industrial, chemical or metallurgical application.

It is known, for example, that a titanium-iron alloy of substantially the composition TiFe (equiatomic) is able to absorb hydrogen at ambient temperature and at a pressure of 20 to 50 bar (see U.S. Pat. No. 3,516,263).

The storage capacity of the TiFe alloy can vary significantly between, say, 1 and 1.75% of hydrogen (by weight of the alloy) depending upon the purity of the alloy and the purity of the hydrogen.

A TiFe alloy of this type can be used for more than 3000 absorption/desorption cycles without reduction in its storage capacity when the system is in a sealed vessel, although the capacity is found to drop when the hydrogen in contact with the alloy is changed from cycle to cycle.

It is thus assumed that impurities present in the hydrogen tend to inhibit absorption at ambient temperature in the Ti-Fe alloy and results in the formation at more elevated temperatures of oxides such as $Ti_{10}Fe_7O_3$, whose presence reduces the absorption capacity and hence the ability of the alloy to store hydrogen.

At page 31 of *Hydrogen, Its Technology and Implications*, Vol. II, "Transmission and Storage," published by CCR Press, Cleveland, Ohio, it is indicated that the presence of amounts as small as 0.01% (100 ppm) of oxygen in gaseous hydrogen is able to significantly inhibit the metal-hydrogen reaction of the TiFe system.

Storage systems using TiFe alloys, therefore, have practically been limited to the use of anhydrous hydrogen with the purity of at least 99.99%.

For instance, instructions for the use of an AHT-5 type reservoir with titanium-iron hydride, developed by the Billings Research Corporation, Utah, exclude the possibility of using this system for technical grade hydrogen with a purity generally of about 99.5% and which can contain 0.5% air.

In U.S. Pat. Nos. 3,922,872 and 4,079,523, proposals have been made for modifying the TiFe alloy including various iron substituents, especially manganese and/or nickel. Various studies have been made of ternary alloys based on TiFe and containing as the tertiary metal a transition metal substituent for Fe. These afforts are described by G. D. Sandrock: *"Metallurgical Considerations in the Production and Use of FeTi Alloys for Hydrogen Storage,"* published in Proc. 11th International Energy Conversion and Engineering Conference, pp. 965–971, by American Institute of Chemical Engineers, New York, 1974;

J. J. Reilly: *"Titanium Alloy Hydrides and Their Applications,"* published in Proc. First World Hydrogen Energy Conference, by Verizroglu T. N. Ed. University of Miami, Coral Gables, Flor., 1976.

The state of the art represented by these publications illustrates that it is possible to reduce the equilibrium pressure of the hydride further by the TiFe alloy, when chromium, manganese, cobalt, nickel or copper are substituted in part for the iron. Thus, ternary alloys can be used for the storage of hydrogen at reduced pressure from that which would be required for the TiFe alloy alone by the introduction of one or another of these substituents mentioned above.

However, experiments with such ternary systems have demonstrated that problems are encountered with the storage of hydrogen in several senses.

Firstly, oxidizing impurities adversely affect the storage capacity for large quantities of hydrogen. Secondly, the capacity for the storage of hydrogen of such ternary alloys cannot satisfactorily be maintained for hydrogen of technical grade over a large number of absorbtion/desorption cycles.

Thirdly, the alloys are not always satisfactory for the storage of hydrogen at desirable temperature and pressure levels and at a reasonable cost.

OBJECTS OF THE INVENTION

It is the principal object of the present invention, therefore, to overcome each of the disadvantages enumerated above and, thus, to provide an alloy which is free from the drawbacks of prior art alloys in each of the enumerated respects.

A more specific object of the invention is to provide a hydrogen-storage composition or alloy which can be utilized for the storage of large quantities of hydrogen without material detriment because of the presence of any reasonable quantities of oxidizing agents or substances.

Still another object of the invention, is to provide an improved hydrogen-storing alloy based upon titanium and iron and which can be subjected without loss of storage capacity to exceptionally large numbers of absorption/desorption cycles even with technical grade hydrogen.

A further object of this invention is to provide an improved alloy for the purposes described which will allow hydrogen absorption under acceptable temperature, pressure and duration conditions with optimum utilization of the storage material and relatively low capital and operating cost.

SUMMARY OF THE INVENTION

It has now been found, quite surprisingly, that these objects can be attained with essentially a quaternary alloy of a titanium-iron based which is essentially stable, nonoxidizable, capable of rapidly absorbing large quantites of hydrogen and adapted to have a sustained storage capacity over numerous absorption/desorption cycles even with hydrogen of technical grade, where the alloy corresponds, in atomic composition, to the formula $Ti_wFe_xM'_yM''_z$, in which M' is an iron substituent which is selected from at least one of the transition metals of groups Vb and VIb of the periodic table, M'' is another iron substituent selected from the group which consists of manganese and nickel or a combination of the two, but which is exclusively nickel when M' is chromium, the M' component apparently serving to render the alloy substantially nonoxidizable even in the presence of oxygen-containing impurities or other oxidizing agents in the hydrogen to be absorbed. M", however, appears to promote absorption of hydrogen by the alloy.

It has been found that y and z should each be between 0.01 and 0.2 with the atomic concentration w of the titanium being at least equal to the sum of the atomic concentrations x, y and z of the iron and transition metal substituents M' and M", i.e. $w \geq (x+y+z)$.

The periodic table can be that found on pages 448 and 449 of the *Handbook of Chemistry and Physics*, 41st Edition, 1959-60.

The present invention also resides in a method of storing hydrogen in which the particular alloy of the present invention, which is at least a quaternary alloy, is formed and then activated by subjecting it to contact with high purity hydrogen, whereupon it is degassed. The alloy can be made by melting together the elements required under a nonoxidizing atmosphere, e.g. argon, whereupon the alloy is cast and comminuted. The alloy powder can be used for the conventional absorption, storage and desorption cycling. Absorption can be effected at pressures between 20 and 70 bar at temperatures ranging from ambient temperature (20° C.) to somewhat less than 100° C. Desorption can be effected at a reduced pressure (e.g. between 1 torr and 10 bar), usually at an ambient pressure of about 1 bar, and at a somewhat higher temperature than used for absorption, say 90° C. to 200° C. Technical grade hydrogen can be used notwithstanding the fact that it may have some oxidizing component.

BRIEF DESCRIPTION OF THE DRAWING

The above and other objects, features and advantages of the present invention will become more apparent from the following description, reference being made to the accompanying drawing in which:

FIGS. 1a through 3a are graphs in which the percentage hydrogen is plotted along the ordinate against the number of cycles plotted along the abscissa and illustrating the results contained in comparative examples according to the invention; and FIGS. 1b through 3b are corresponding graphs in which the percentage hydrogen is plotted along the ordinate against absorption time along the abscissa, the time being given in minutes.

SPECIFIC DESCRIPTION AND EXAMPLES

EXAMPLE 1

A. Preparation

A quaternary alloy having the composition $Ti_{0.5}Fe_{0.45}Cr_{0.025}Ni_{0.025}$ is prepared by melting together corresponding amounts of titanium, iron, chromium and nickel under an argon protective atmosphere, casting and solidifying the melt also under argon and then grinding the cast body to a mean particle size of 0.5 mm to form a powder.

B. Activation

The alloy powder prepared as in step A is activated by contacting it with high purity hydrogen (99.9997%, hereinafter referred to as pure hydrogen). The powder is first subjected to degassing in an autoclave which is heated to 300° C. and to which a vacuum of $10^{-2}$ torr is applied.

B.1 Absorption

After degassing, the alloy powder is contacted with hydrogen in the autoclave at a pressure of 50 bars and the autoclave is cooled to 25° C. Absorption of hydrogen is thus effected at 25° C. and 50 bar, the alloy powder being saturated with hydrogen in less than an hour.

B.2 Desorption

After the absorption phase the autoclave is heated to 200° C. to drive off the hydrogen, the autoclave being held at a pressure of 1 bar until at least the major part of the absorbed hydrogen is driven from the alloy powder. At the end of an hour of desorption under these conditions, the residual hydrogen of the alloy corresponds to about 0.05% hydrogen (by weight of the alloy).

B.3 Absorption/Desorption Cycles

The activation of the powder is effected through a number of successive absorption/desorption cycles according to steps B.1 and B.2 above until the total quantity of hydrogen absorbed in the powder is constant in the next cycle. The powder is then considered fully activated and has a storage capacity of 1.8% pure hydrogen (by weight of the alloy).

C. Kinetic Tests

A portion of the alloy powder thus activated is subjected to a series of tests intended to establish the speed of absorption of pure hydrogen by the alloy.

The hydrogen-saturated activated alloy powder is placed in a microbalance operable under pressure and a series of cycles of desorption and absorption of hydrogen are carried out under isothermal and isobaric conditions.

D. Storage Tests

A sample formed by 5 g of the activated alloy powder is subjected to a series of tests for the storage of technical grade hydrogen which contains 0.5% air.

For these tests, each sample is subjected to a series of absorption/desorption cycles under the temperature and pressure conditions at B.1 and B.2, respectively, except that for eacy cycle a fresh quantity of technical grade hydrogen is used instead of the pure hydrogen for the absorption at 25° C. at the initial pressure of 50 bar.

Figure 1A:
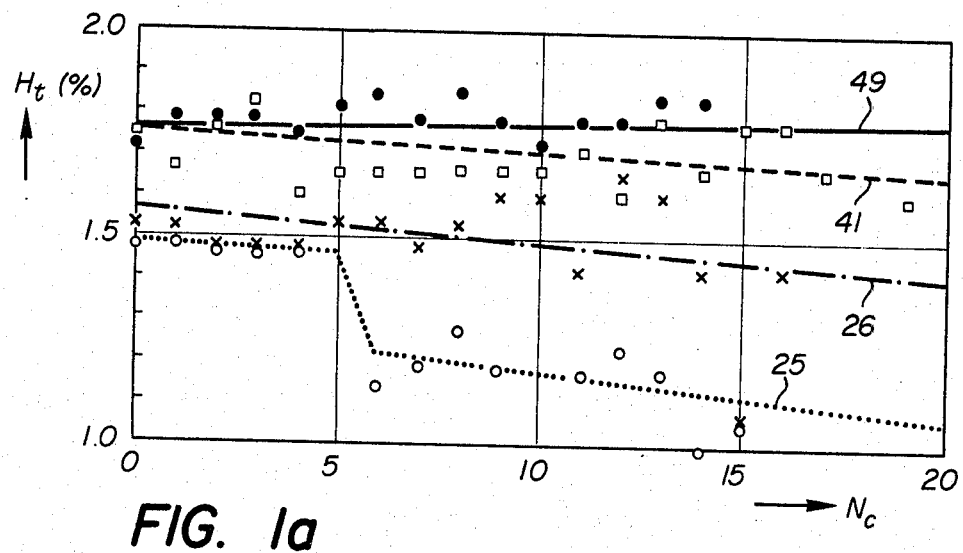

The pressure drop in the autoclave during the absorption is measured until the pressure prevailing therein becomes constant. From the measurement of the pressure drop the quantity of technical hydrogen absorbed during each storage cycle is calculated and the storage capacity $H_t$ for the technical grade hydrogen in percentage by weight of the alloy forming the sample is plotted. Figure No. 49 in FIG. 1a represents the results of this series of storage tests and gives the value of the storage capacity $H_t$ as a function of the number $N_c$ of successive storage cycles effected with this sample of the quaternary alloy. The line identified by the reference 49 in FIG. 1a represents the least square average determined by the experimental points of this series.

E. Comparative Tests

By way of comparison with the results mentioned above, a series of comparative tests were carried out on other alloys based upon the Ti-Fe system and prepared, activated and tested in the manner described above at points A through D.

The broken line 25 in FIG. 1a corresponds to a plot of the storage capacity $H_t$ for technical hydrogen absorbed in a binary alloy consisting of TiFe, i.e. an alloy having the atomic composition $Ti_{0.5}Fe_{0.5}$ and containing neither chromium or nickel as a substituent for iron as in the preceding case.

Figure 1B:
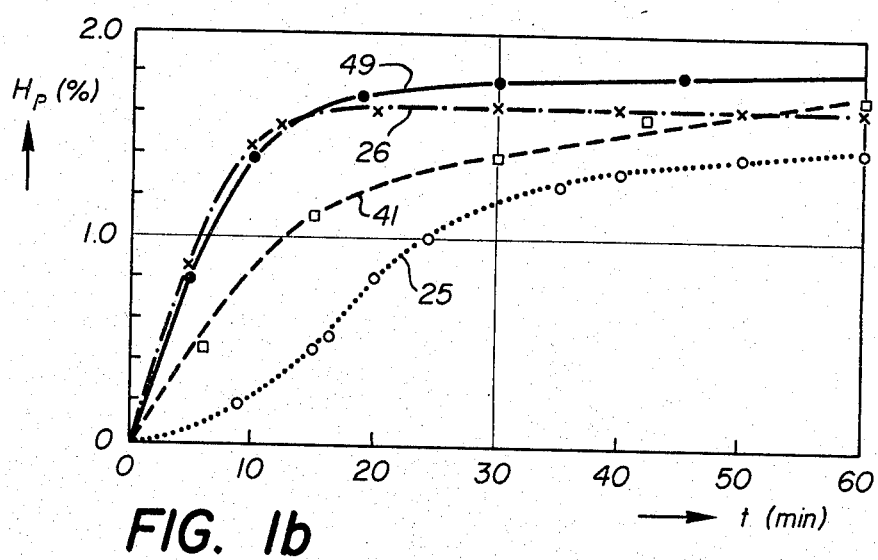

Similarly, the curve 25 in FIG. 1b shows the variation, as a function of time, of the concentration $H_p$ of hydrogen absorbed by weight of the binary alloy Ti-Fe.

FIGS. 1a and 1b also show analoguous experiments with the curves 26 corresponding to the results obtained with the atomic composition $Ti_{0.49}Fe_{0.49}Ni_{0.02}$ in which nickel is thus the sole substituent for iron, i.e. a ternary alloy.

These FIGS. also include analoguous experimental curves 41 corresponding to the results obtained with a ternary alloy having the atomic composition $Ti_{0.5}Fe_{0.475}Cr_{0.025}$ in which chromium is the sole substituent for iron.

As can be seen from FIGS. 1a and 1b:

The storage capacity $H_t$ of the composition TiFe (curve 25, FIG. 1a) is about 1.5% up to $N_c=5$ and thereupon drops suddenly to about 1.1% at $N_c=15$.

The concentration $H_p$ of absorbed hydrogen in the composition TiFe (curve 25, FIG. 1b) increases only slightly as a function of time, without attaining a value of as much as 1.5% in an hour.

The storage capacity $H_t$ of the quaternary alloy Ti-Fe-Cr-Ni of the present invention (curve 49, FIG. 1a) maintains a relatively high value of about 1.79% without any significant drop over 14 storage cycles.

The concentration of hydrogen $H_p$ of the quaternary alloy Ti-Fe-Cr-Ni of the present invention (curve 49, FIG. 1b) climbs rapidly and reaches a value of 1.5% after about 11 minutes, a value of 1.6% after 15 minutes and a value of 1.8% after 30 minutes of absorption.

The storage capacity $H_t$ of the ternary alloys which contain chromium or nickel as the sole substitute for iron (curves 41 and 26, FIG. 1a) is maintained at about 1.5% without undergoing a noticeable systematic decrease until 12 and 16 cycles respectively.

The hydrogen concentration $H_p$ of the ternary alloy Ti-Fe-Cr (curve 41, FIG. 1b) reaches a value of 1.4% after 30 minutes and 1.7% after 60 minutes of absorption.

The hydrogen concentration $H_p$ of the ternary alloy Ti-Fe-Ni (curve 26, FIG. 1b) reaches a value of 1.5% after 12 minutes and of 1.65% after 60 minutes of absorption.

Thus the presence of two substituents in the quaternary alloy Ti-Fe-Cr-Ni of the present invention makes it possible to significantly increase the rate of absorption of hydrogen even in the presence of impurities in the gas while maintaining the storage capacity at a value in excess of 1.7%.

Consequently, the quaternary alloy Ti-Fe-Cr-Ni enables a more complete and rapid storage of hydrogen than the other cases discussed above.

Tests have also been made, by way of comparison, on an alloy of the atomic composition $Ti_{0.5}Fe_{0.45}Cr_{0.05}$ to determine the effect of replacing the nickel in the ternary alloy of Example 1 by an additional equivalent of chromium. The results obtained with this ternary alloy are not shown in the drawing but are generally worse than those represented by the curve 21 for the alloy $Ti_{0.5}Fe_{0.475}Cr_{0.025}$. In other words, the results obtained can be considered to be a curve between the curves 41 and 25.

EXAMPLE 2

A quaternary alloy having the atomic composition $Ti_{0.5}Fe_{0.449}V_{0.024}Ni_{0.027}$ is prepared, activated and subjected to test in the manner described in Example 1. These tests have provided the experimental curves No. 48 represented by FIGS. 2a and 2b.

Figure 2A:
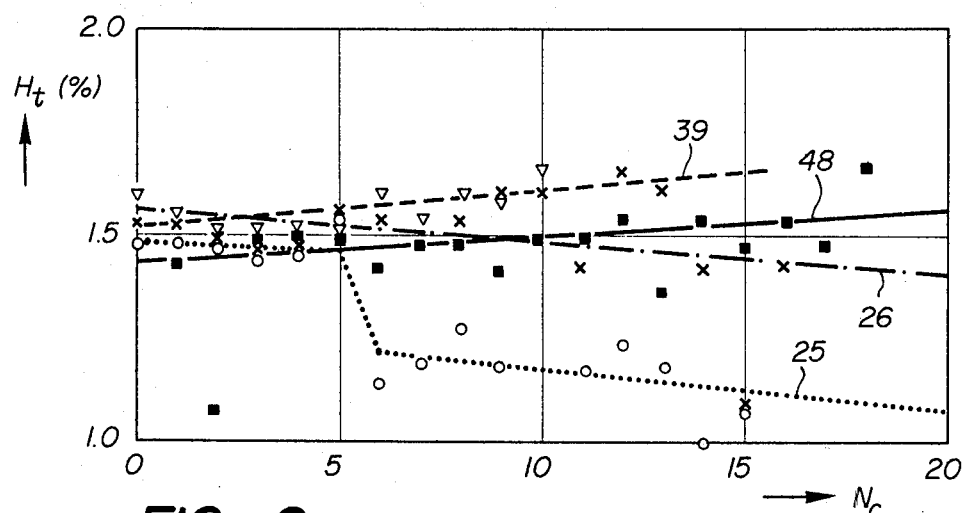
Figure 2B:
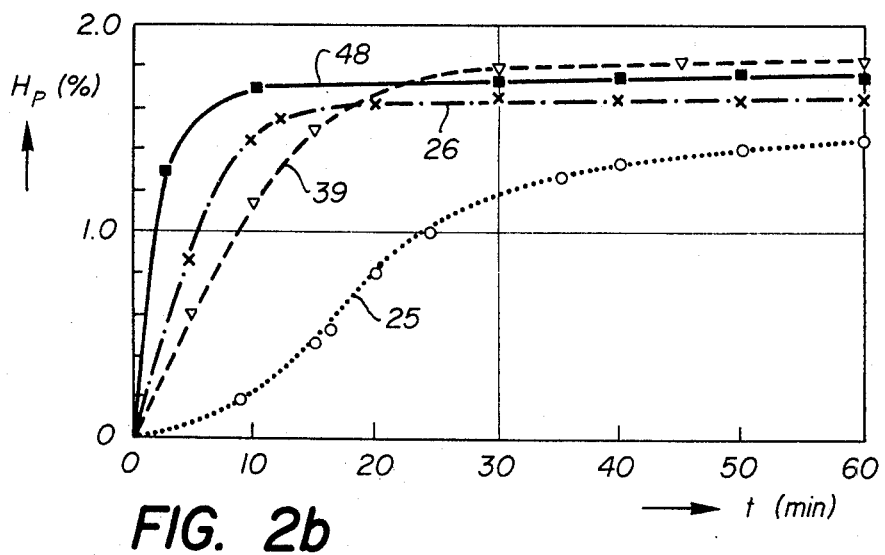

A ternary alloy having the atomic composition $Ti_{0.49}Fe_{0.477}V_{0.033}$ prepared, activated and subjected in a similar fashion to comparative tests, has provided the experimental curves No. 39 also represented in the FIGS. 2a and 2b.

These FIGS. 2a and 2b in addition show the experimental curves Nos. 25 and 26 already described in Example 1 and represented in FIGS. 1a and 1b.

As can be seen from these experimental curves in FIGS. 2a and 2b:

The quaternary alloy Ti-Fe-V-Ni in accordance with the present example maintains a constant storage capacity $H_t$ during the course of 18 cycles (line 48, FIG. 2a) with a mean value of about 1.49%. In addition, the concentration $H_p$ of hydrogen absorbed rises very rapidly (curve 48, FIG. 2b) and reaches 1.5% in 5 minutes.

The ternary alloy Ti-Fe-V subjected to the comparative tests in the present example maintains an almost constant storage capacity $H_t$ over the 10 cycles (line 39, FIG. 2a) with a mean value of about 1.55%. The hydrogen concentration $H_p$ however rises less rapidly (curve 39, FIG. 2b) and reaches 1.5% in 15 minutes.

The quaternary alloy Ti-Fe-V-Ni in accordance with the present example, containing only 2.4 atomic percent of vanadium and 2.7 atomic percent of nickel as substituents for iron, can thus store 1.5% of technical grade hydrogen during at least 18 cycles and can in addition absorb hydrogen more rapidly than the ternary alloy Ti-Fe-V which contains a much greater proportion (3.3 atomic percent) of vanadium as the sole substituent of iron.

EXAMPLE 3

A quaternary alloy having the atomic composition $Ti_{0.501}Fe_{0.452}V_{0.024}Mn_{0.023}$ is prepared, activated and subjected to tests in the manner described in Example 1. The curves No. 107 in FIGS. 3a and 3b represent the results obtained in this instance.

A ternary alloy having the atomic composition $Ti_{0.5}Fe_{0.473}Mn_{0.027}$ is likewise prepared, activated and subjected to comparative tests in a similar fashion. The experimental curves No. 27 in FIGS. 3a and 3b represent the results of these comparative tests.

In addition, these FIGURES show the experimental curves No. 25 and No. 39 already described in the preceding examples.

Figure 3A:
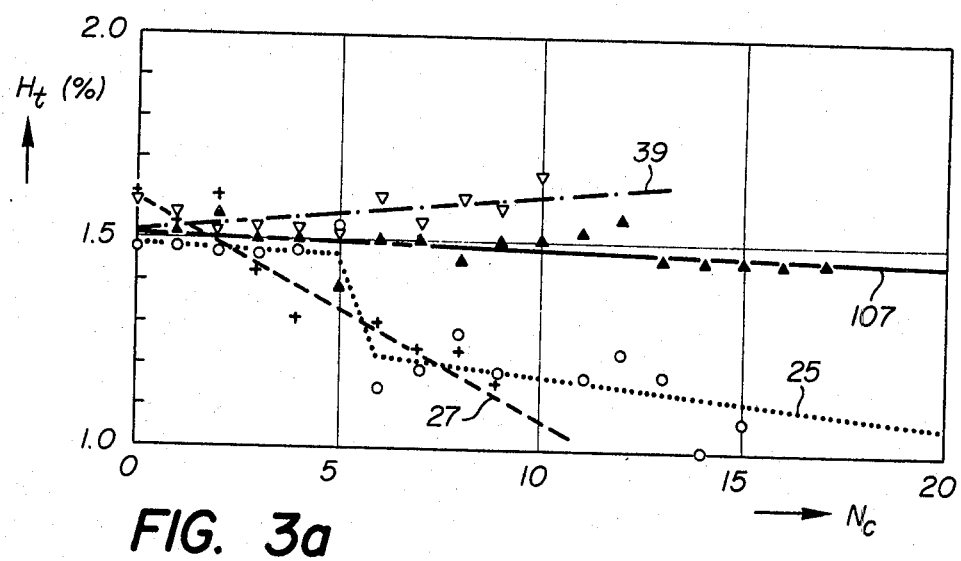
Figure 3B:
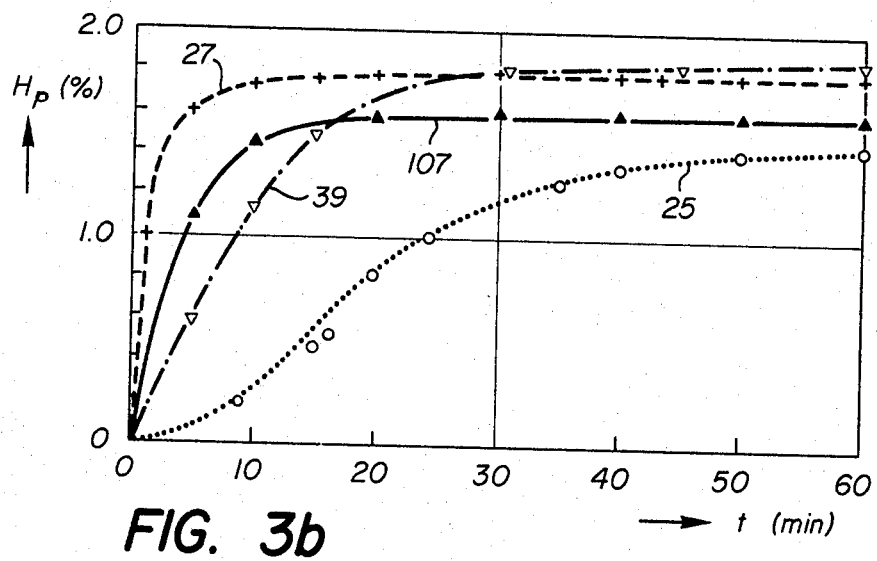

As can be seen from FIGS. 3a and 3b:

The quaternary alloy in accordance with the present invention maintains an almost constant storage capacity $H_t$ over the course of 17 cycles (line 107, FIG. 3a) with a mean value of about 1.48%. In addition, the hydrogen concentration $H_p$ rises rapidly (curve 107, FIG. 3a) and reaches 1.5% in 11 minutes.

The ternary alloy Ti-Fe-Mn subjected to comparative tests in the present invention undergoes a considerable drop in the storage capacity $H_t$ starting with the fifth cycle (line 27, FIG. 3a). The hydrogen concentration $H_p$ increases very rapidly (line 27, FIG. 3b) and reaches 1.5% in 4 minutes.

The ternary alloy Ti-Fe-V as illustrated in curves No. 39 in Example 2, maintains an almost constant storage capacity $H_t$ over 10 cycles (line 39, FIG. 3a) but hydrogen is absorbed less rapidly and the hydrogen concentration attained is 1.5% in 15 minutes (curve 39, FIG. 3b).

The quaternary alloy Ti-Fe-V-Mn in accordance with the present invention, containing only 2.4 atomic percent of vanadium and 2.3 atomic percent of manganese as iron substituents, can thus store about 1.5% technical grade hydrogen during at least 17 cycles and can, in addition, absorb hydrogen more rapidly than the ternary alloy Ti-Fe-V which contains a greater proportion (3.3 atomic percent) of vanadium as the sole substituent.

The results of the above examples are summarized in the following Table and demonstrate the efficacy of quaternary alloys for the storage of technical grade hydrogen in accordance with the present invention.

| | RESULTS OBTAINED IN EXAMPLES 1 TO 3 | | | | | |
|---|---|---|---|---|---|---|
| Example Test No. | Alloy | Storage Capacity $H_t$ % by weight initial | mean | Time t (min) for $H_p$ = 1.5% | Storage Capacity $H_p$ % by weight after 5min | after 15m |
| Example 1 | | | | | | |
| 49 | Ti—Fe—Ni—Cr | 1.76 | 1.79 | 12 | 1.00 | 1.60 |
| 41 | Ti—Fe—Cr | 1.77 | 1.67 | 40 | 0.50 | 1.00 |
| 26 | Ti—Fe—Ni | 1.56 | 1.49 | 12 | 1.00 | 1.60 |
| 25 | Ti—Fe | 1.52 | 1.24 | 60 | 0.1 | 0.50 |
| Example 2 | | | | | | |
| 48 | Ti—Fe—V—Ni | 1.44 | 1.49 | 5 | 1.5 | 1.70 |
| 39 | Ti—Fe—V | 1.51 | 1.55 | 15 | 0.65 | 1.50 |
| 26 | Ti—Fe—Ni | 1.56 | 1.49 | 12 | 1.00 | 1.60 |
| 25 | Ti—Fe | 1.52 | 1.29 | 60 | 0.1 | 0.50 |
| Example 3 | | | | | | |
| 107 | Ti—Fe—V—Mn | 1.51 | 1.48 | 11 | 1.1 | 1.55 |
| 39 | Ti—Fe—V | 1.51 | 1.55 | 15 | 0.6 | 1.50 |
| 27 | Ti—Fe—Mn | 1.60 | 1.40 | 4 | 1.6 | 1.75 |
| 25 | Ti—Fe | 1.52 | 1.24 | 60 | 0.1 | 0.5 |

I claim:
1. A titanium-iron based alloy for the storage of hydrogen having the formula:

$$Ti_wFe_xM'_yM''_z$$

wherein
M' is a metal selected from the group consisting of chromium and vanadium and having an ability to render a titanium-iron based alloy substantially nonoxidizable in the presence of oxidizing impurities in the hydrogen to be stored;
M'' is a metal selected from the group consisting of nickel and manganese but is nickel where M' is chromium and is capable of promoting absorption of hydrogen in the alloy;
y and z are each 0.01 to 0.2; and
w is at least equal to the sum of x, y, and z.

2. The alloy defined in claim 1 wherein M' is selected from the group consisting of chromium and vanadium and M'' is nickel.

3. The alloy defined in claim 1 wherein M' is chromium and M'' is nickel.

4. The alloy defined in claim 1 wherein M' is vanadium and M'' is nickel.

5. The alloy defined in claim 1 wherein M' is vanadium and M'' is manganese.

6. A method of storing hydrogen which comprises the following steps:
(a) forming a titanium-iron based alloy having the formula $$Ti_wFe_xM'_yM''_z$$

wherein
M' is a metal selected from the group consisting of chromium and vanadium and having an ability to render a titanium-iron based alloy substantially nonoxidizable in the presence of oxidizing impurities in the hydrogen to be stored;
M'' is a metal selected from the group consisting of nickel and manganese but is nickel where M' is chromium and is capable of promoting absorption of hydrogen in the alloy;
y and z are each 0.01 to 0.2; and
w is at least equal to the sum of x, y and z;
(b) contacting said alloy with hydrogen at a temperature and pressure sufficient to effect the absorption of hydrogen by the alloy;
(c) storing the alloy upon its absorption of hydrogen;
(d) subjecting the alloy subsequent to step (c) to pressure and temperature conditions sufficient to desorb hydrogen therefrom; and
(e) repeating steps (b), (c) and (d) over a multiplicity of cycles.

7. The method defined in claim 6 wherein M' is selected from the group consisting of chromium and vanadium and M'' is nickel.

8. The method defined in claim 6 wherein M' is chromium and M'' is nickel.

9. The method defined in claim 6 wherein M' is vanadium and M'' is nickel.

10. The method defined in claim 6 wherein M' is vanadium and M'' is manganese.

* * * * *